A. S. DENNIS.
TYPE WRITING MACHINE.
APPLICATION FILED OCT. 8, 1913.
1,256,986.
Patented Feb. 19, 1918.
2 SHEETS—SHEET 2.
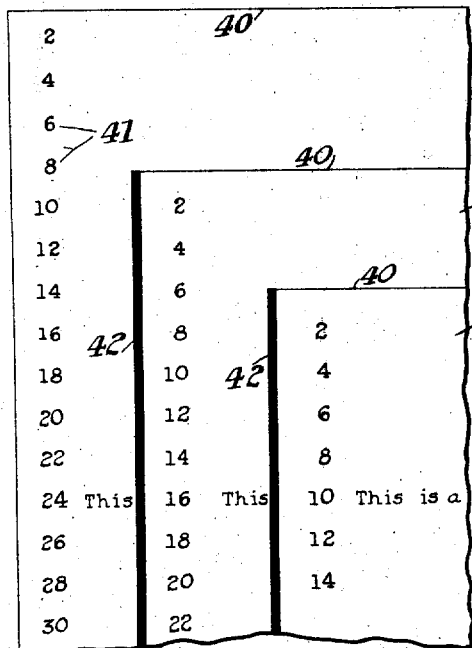
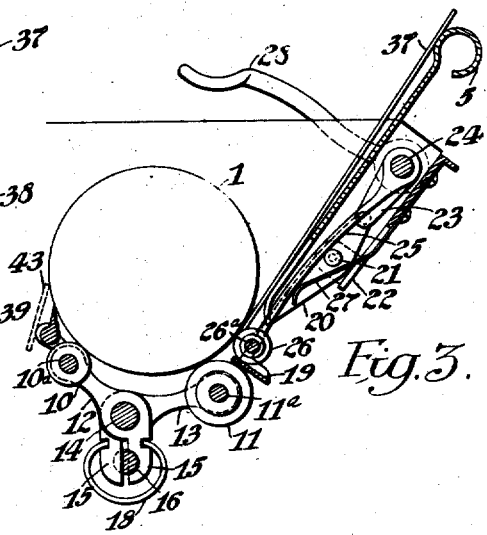
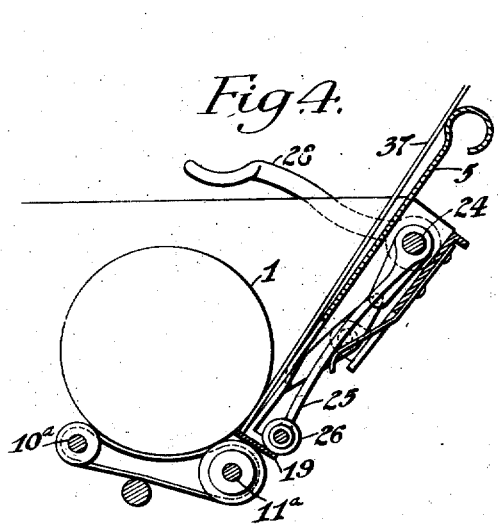
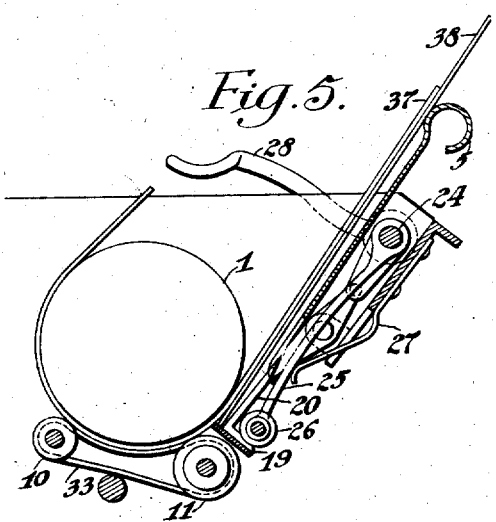
Witnesses:—
E. A. Rennie
Titus H. Rowe
Inventor:
Adolphus S. Dennis
by B. B. Stickney
his Attorney.

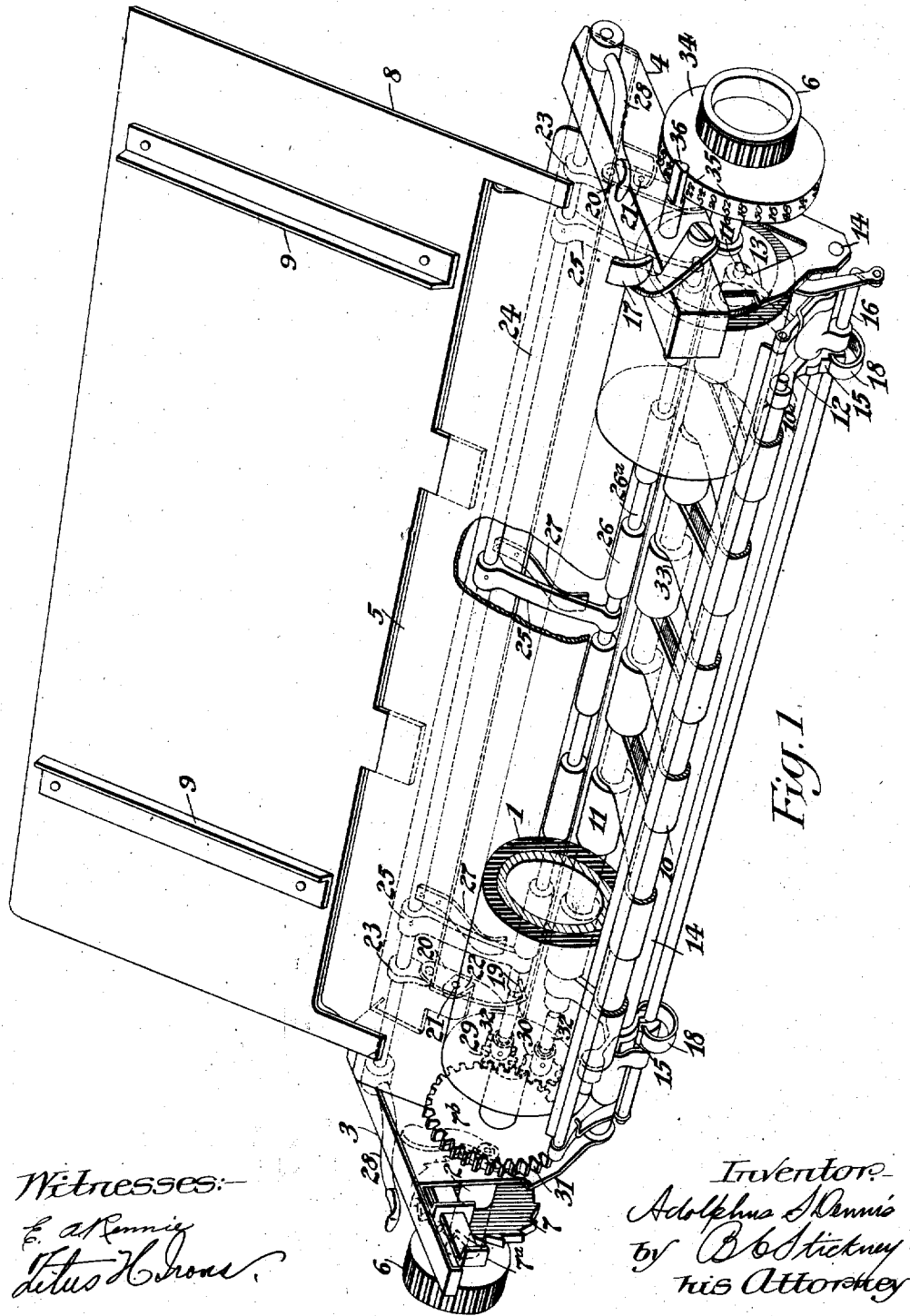

UNITED STATES PATENT OFFICE.

ADOLPHUS S. DENNIS, OF LAKEWOOD, OHIO, ASSIGNOR TO UNDERWOOD TYPEWRITER COMPANY, OF NEW YORK, N. Y., A CORPORATION OF DELAWARE.

TYPE-WRITING MACHINE.

1,256,986.      Specification of Letters Patent.      Patented Feb. 19, 1918.

Application filed October 8, 1913. Serial No. 793,996.

*To all whom it may concern:*

Be it known that I, ADOLPHUS S. DENNIS, a citizen of the United States, residing in Lakewood, in the county of Cuyahoga and State of Ohio, have invented certain new and useful Improvements in Type-Writing Machines, of which the following is a specification.

This invention relates to means for gaging and feeding work-sheets in typewriting machines, together with indicating means to enable a number of work-sheets to be accurately positioned one in advance of another, to permit writing at different relative positions on the work-sheets.

The principal feature of the present invention consists in the use of a scale or index connected to travel or rotate with the platen, and coöperating with the work-sheet feeding and gaging mechanism to indicate the extent of rotation of the platen between the placing of succeeding sheets thereon, and thereby enable the several work-sheets to be placed in any pre-determined relative position with their leading edges at different degrees in advance of one another.

Mechanism for gaging and feeding the work-sheets is also herein shown, although such mechanism may be varied within the scope of the present invention.

The traveling scale or indicator may consist of a wheel or disk mounted to rotate with the platen, and provided on its periphery with a series of numbers arranged in a reversed order so as to be brought in a descending order to indicating position as the platen is rotated forwardly, said numbers spaced to correspond to line-space intervals, that is, the angular distance between any two numbers on the scale is equal to the angular rotation of the platen required to feed a work-sheet the distance from one to the other of the lines represented by said numbers. The index may thus be used to indicate the positions to which the platen should be rotated prior to the introduction of the work-sheets, to enable said work-sheets to be placed in any desired relative position in the machine.

If, for example, it is desired to superpose two work-sheets on the platen in such relation that the first line of writing on the first work-sheet will be at line numbered 24, and on the second sheet at line numbered 16 (the lines being numbered on the work-sheets), the index disk is rotated to bring the number "24" thereon opposite a coöperating pointer or gage. The first work-sheet is then gaged on the machine and fed forwardly by rotating the platen until number "16" appears opposite the index gage. A second work-sheet is then gaged on the machine and fed forwardly until the number "16" thereon appears at the writing line. The work-sheets are now in position to be written on, so that the first line of writing will appear on line 24 on the first sheet and on line 16 on the second sheet. Additional sheets may likewise be placed at any desired positions relative to the other sheets.

Other features and advantages will hereinafter appear.

In the accompanying drawings, which illustrate the invention as adapted to an Underwood front-strike writing machine, Figure 1 is a perspective view of the platen frame and platen in combination with the mechanism comprising my invention.

Fig. 2 is a fragmentary diagrammatic view of a number of work-sheets arranged with their leading edges at different positions of advancement.

Figs. 3, 4 and 5 are sectional side elevation views illustrating different steps in the positioning and gaging of work-sheets on the platen. Fig. 3 shows a work-sheet dropped into position behind the platen, the leading edge resting against the platen and auxiliary feed roll. Fig. 4 shows the auxiliary feed roll retracted and the gage thrown forward to receive the leading edge of the work-sheet, which has dropped down on the gage. Fig. 5 shows the first work-sheet advanced over the platen, and a second work-sheet placed behind the first and in position on the gage.

The usual rotary platen 1 is provided with an axle 2 journaled in the ends 3 and 4 of the platen frame, comprising a paper shelf 5 connecting said ends and located at the introductory side of the platen. The platen may be rotated either by hand wheels 6 secured to the platen axle or by the usual line-spacing mechanism comprising a line-space ratchet wheel 7, a pawl-carrying slide 7ª actuated by the usual line-space lever, and a spring-holding detent 7ᵇ. A special sheet-supporting board 8 may be provided, and extends upwardly and rearwardly from the top of the paper shelf 5, being preferably in the same plane therewith. Opposite side gages 9 may be attached to the board 8 for gaging the side edges of the work-sheets.

At the under side of the platen are the usual front and rear feed rollers 10 and 11 on roller shafts 10ᵃ and 11ᵃ, carried respectively on levers 12 and 13 journaled on a tie-rod 14 parallel with the platen, said levers having depending arms 15 which engage recesses or flattened portions of a rock shaft 16, which, when rocked by depressing the finger key 17 having the usual connection with the end of the shaft 16, rotates the latter and by spreading the arms 15 lifts the pressure rollers 10 and 11 off of the platen, said rollers being normally yieldingly held against the platen by spring clips 18.

The mechanism for gaging the leading edges of the work-sheets, as they are introduced at the rear of the platen, may comprise a gage 19 substantially perpendicular to the platen and carried at the lower ends of levers 20, fulcrumed at 21 to brackets 22 and at their upper ends pivoted to rock arms 23 fixed to a rock shaft 24 journaled in the platen frame. Fixed to said rock shaft 24 are depending arms 25 carrying at their lower ends an auxiliary roll shaft 26ᵃ on which are mounted auxiliary pressure rolls 26 normally held against the platen by leaf springs 27. A finger lever 28 fixed to the rock shaft 24 operates when depressed to lift the pressure rolls 26 from the platen and at the same time swing the gage 19 inwardly against the platen, the gage being normally held away from the platen so as not to interfere with the feeding of the work-sheets.

To place a work-sheet in position on the platen for writing, the sheet is dropped behind the platen to the Fig. 3 position, the handle 28 then depressed to retract the pressure rolls 26 and permit the sheet to drop on the gage 19 as shown in Fig. 4. The sheet is thus accurately alined, and when the finger lever 28 is released, the pressure roll 26 grips the sheet against the platen, so that the latter may be rotated and the sheet fed forwardly without being thrown out of alinement.

To insure a positive feed of the work-sheets and maintain them in accurate alinement, the pressure rolls are preferably positively driven by means of pinions 29 and 30 connected respectively to the shafts 26ᵃ and 11ᵃ carrying the pressure rolls 26 and 11, said pinions meshing with a gear wheel 31 on the platen axle. Said pinions are connected to the pressure roll shafts by short sections 32 having universal joint connections with the shafts and pinions, such connections permitting the pressure rolls to be lifted from the platen without disturbing the relation of the intermeshing gear and pinions. The forward pressure rolls 10 may be positively driven by rubber bands or other belts 33 running on suitable pulleys on the shafts 10ᵃ and 11ᵃ, said belts bearing against the platen between the forward and rearward pressure rolls.

A line indicator or index, adapted to enable the operative to position work-sheets on the platen with their leading edges at any desired relative positions, one in advance of the other, or in other words, to permit the work-sheets to be so positioned that any selected lines on the several sheets are superposed at the line of writing, may conveniently consist of an index disk or wheel 34 mounted on the platen axle to rotate with the platen and having on its periphery a series of indicating characters, as figures 35.

A pointer or index finger 36 forming an indicator gage, fixed in the platen frame extends over the periphery of the disk, so that any number on the disk may be brought to a definite position relative to the said gage. The numbers are preferably arranged in an inverse order, or in other words, so that as the platen is rotated forwardly, the numbers are brought opposite the indicator in a descending scale. For convenience, only the alternate numbers may appear on the scale, as for example, the even numbers as "22", "20", etc. The numbers are also preferably spaced at angular distances corresponding to line-space intervals on the platen, thus, for example, if the platen is rotated forwardly from the position shown, in which the number "24" appears over the index finger 36 to bring the number "20" to such position, the platen will be rotated a distance of four line-spaces.

The index numbers 35 are also preferably arranged so that the scale may be used to indicate line-space intervals greater than a complete rotation of the platen; that is, the lower numbers such as "22", "20", "18", etc., alternate with higher numbers as "54", "52", etc., said higher numbers each representing a complete rotation of the platen in advance of the position that would be designated by a lower number at the same point on the indicator. Thus, for example, the indicating number "54" appears in the position that would be occupied by the number "21", if the latter were placed on the scale; the difference between these two numbers "54" and "21", namely, "33" indicates the number of line-spaces in the circumference of the platen or that a work-sheet would be advanced during a complete rotation of the platen.

In Fig. 2 are shown diagrammatically three work-sheets 37, 38 and 39 with their leading edges 40 at different distances of advancement. The work-sheets are preferably each provided with a series of marginal numbers 41, spaced to correspond with the line-spacing of the machine with which they are used, and said numbers are utilized to assist in placing the work-sheets in any desired relative positions. For example, if it is desired to place the three work-sheets 37, 38 and 39 on the machine in such position that the first line of writing will be at the line numbered "24" on the first work-sheet 37, line numbered "16" on the second work-sheet 38 and line numbered "10" on the third work-sheet 39, the operation of placing the sheets in such position is substantially as follows.

The platen is first rotated until the index wheel 34 is in such position that the index number "24" (answering to line 24 on the first sheet) appears directly over the index finger 36 as shown in Fig. 1. The first sheet 37 is then dropped with its leading edge downward to the Fig. 3 position, the gage lever 28 then depressed to the Fig. 4 position, allowing the sheet 37 to be accurately gaged by the gage 19; the lever 28 is then released and the platen rotated forwardly until the index number "16" on the wheel 34, corresponding to line 16 on the second work-sheet, appears above the index finger 36.

It will be noted that during this rotation the first work-sheet has been fed forwardly, so that its leading edge is eight line-space distances beyond the gage 19. The second work-sheet is now placed in position behind the first work-sheet and the gage lever again depressed to allow the second work-sheet to drop on the gage and thus be accurately alined with respect to the first sheet, said first sheet being securely held against displacement by the platen and pressure rolls 10 and 11. A carbon sheet 42 may now be placed between the two work-sheets and the platen again rotated, this time to bring the index number "10" to a position over the index finger 36. This second rotation, it will be noted, is the distance of six line-spaces, that is, the difference between lines 10 and 16 on the second and third work-sheets. The third work-sheet 39 is now placed on the machine and gaged, and a second carbon sheet placed between the second and third work-sheets.

The work-sheets are now in the relative position of advancement indicated in Fig. 2, namely, with line 10 of the third work-sheet directly over line 16 of the second work-sheet, and over line 24 of the first work-sheet. The platen may now be rotated forwardly until line 10 on the third work-sheet is over the printing line on the platen, such position being indicated by the gage 43, Fig. 3. The machine may now be operated in the usual way to print any desired matter on the work-sheets, such printed matter appearing on lines 24, 16, and 10 respectively of the three work-sheets.

It will thus be seen that by means of the indicating device 34 in conjunction with the gaging means, the work-sheets may be readily placed on the platen at any desired relation to each other. In the example illustrated, the work-sheets are provided on their front faces with line-indicating numbers spaced to correspond with the line-space distances of the machine with which they are used, but the invention may also be employed with work-sheets that are not provided with line numbers or rulings, as the indicating device 34 enables the operative to place one sheet in advance of another on the platen any desired number of line-spaces, entirely independent of any markings appearing in the work-sheets.

Although the indicator 34 is in the form of a disk secured to the platen axle, it will be understood that the invention comprehends broadly an indicating device movable in unison with the rotation of the platen, whether connected to rotate with the platen or otherwise operated, so that its speed will bear a definite ratio to that of the platen.

Variations may be resorted to within the scope of the invention, and portions of the improvements may be used without others.

Having thus described my invention, I claim:

1. The combination, with a rotary platen, and feed-rolls coöperative with said platen for feeding a plurality of superposed work-pieces therearound; of a gage located at the introductory side of said platen for positioning the leading edges of the successive work-pieces; an auxiliary feeding device movable into and out of coöperative relation to said platen, so as to alternately hold a work-piece in gaged position against the same for rotation therewith, and release such work-piece to permit the next one to be gaged; and a device for indicating the extent of angular or line-space rotation of the platen and the work-piece or pieces thereon, said indicating device having line-numbers thereon running reversely with respect to the line-feeding movement of the platen, thereby to enable the platen to be initially rotated to a predetermined line-space position corresponding to that of the first line of writing on the first work-piece to be introduced; and also, to enable each work-piece, as it is introduced, to be successively gaged with relation to the platen and the previously-positioned work-piece or pieces, held in gaged position against said platen, and rotated with the latter into a predetermined line-space position corresponding to that of the first line of writing on the next work-piece to be introduced; all of the work-pieces, after having been so positioned, being subsequently fed around the platen in unison in such relation, first to the printing point, and thereafter throughout the entire printing operation.

2. The combination with a revoluble platen, of means for collating or superposing sheets in different set relationships thereon, so that all of the sheets may be written on at a single operation, but so that the line of writing will fall in different places upon the several sheets in respect to their leading edges, said means comprising a gage at the introductory side of the platen, a sheet collating scale and an index for the leading edge of the sheet, said scale having line-numbers thereon running reversely with respect to the line-feeding movement of the platen, said scale and index coöperative to determine the extent to which the platen shall advance the first sheet from its gaged position preparatory to gaging the second sheet to permit a second sheet to be inserted and gaged by said gage.

3. The combination with a revoluble platen, of means for collating or superposing sheets in different relationships thereon, so that all of the sheets may be written on at a single operation, but so that the line of writing will fall in different places upon the several sheets in respect to their leading edges, said means comprising an end gage at the introductory side of the platen, said gage movable to and from gaging position and a leading-edge collating scale, said scale having line-numbers thereon running reversely with respect to the line-feeding movement of the platen, said scale settable to determine the position of the platen for each movement of the gage to gaging position, whereby the leading edges of the several sheets are introduced the proper distance behind one another, and means for feeding all of said sheets to the printing point of the platen.

4. The combination with a revoluble platen, of a line scale connected to said platen, said scale having line-numbers thereon running reversely with respect to the line-feeding movement of the platen, a platen frame having an index to coöperate with said scale, a main feed roll to run on said platen, a normally withdrawn gage for the leading edge of the sheet, said gage arranged at the introductory side of the platen to gage the sheet preparatory to being advanced to said main feed roll, and an auxiliary feed roll or device movable to and from the platen independently of said main feed roll and placed at the introductory side of the platen in proximity to said gage, to hold against the platen the sheet which has been located by means of said gage, and to remain pressing the sheet against the platen while the gage is withdrawn, to feed said sheet to said main feed roll; said gage being between said rolls.

5. The combination with a revoluble platen, of means for collating or superposing sheets in different set relationships thereon, so that all of the sheets may be written on at a single operation, but so that the line of writing will fall in different places upon the several sheets, comprising a main feed roll to run on the platen, means for differentially engaging the leading edges of successive sheets in advance one of another to the desired extent, said differentially engaging means comprising (1) a gage at the introductory side of the platen, (2) means to withdraw the gage, (3) means to hold the gaged sheet against the platen to coöperate therewith to advance the gaged sheet to the main feed roll, and (4) a sheet-collating scale and index for the leading edges of the sheets, said scale having line-numbers thereon running reversely with respect to the line-feeding movement of the platen, said scale and index coöperative to determine the extent to which the platen and main feed roll shall advance the first sheet from its gaged position, preparatory to resetting the gage to the platen and withdrawing the temporary holder, to permit a second sheet to be inserted back of the first sheet and gaged by said gage while the first sheet remains held against the platen by said main feed roll.

6. In a typewriting machine, the combination with a revoluble platen, of a main feed roll to run on said platen, a normally withdrawn gage for the leading edge of the sheet, said gage arranged at the introductory side of the platen to gage the sheet preparatory to being advanced to said main feed roll, and an auxiliary feed roll movable to and from the platen independently of said main feed roll and placed at the introductory side of the platen in proximity to said gage, to hold against the platen the sheet which has been located by means of said gage, and to remain pressing the sheet against the platen while the gage is withdrawn, to feed said sheet to said main feed roll, said gage being between said rolls.

7. The combination with a revoluble platen, of means for mechanically selecting different line-numbers on consecutively inserted superposed work-sheets on which the first line of writing is to fall, comprising a releasable leading-edge gage, a leading-edge scale for the platen, an index for said scale, the line-numbers on the scale running reversely with respect to the line-feeding movement of the platen, to correspond with line-numbers placed on the faces of the work-sheets and running from top to bottom of the sheets, whereby the line-number on the sheet on which the first line of writing is to fall may be mechanically selected for each successive one of the superposed sheets by first turning the platen in each case until the index points to the number selected for that sheet, preparatory to gaging the leading edge of such sheet by said gage, sheet-feeding means between the gage and the printing point, and independently releasable sheet-feeding means at the introductory side of the gage.

ADOLPHUS S. DENNIS.

Witnesses:
B. GOLDBERG,
E. B. LIBBEY.